US007966278B1

(12) United States Patent  (10) Patent No.: US 7,966,278 B1
Satish  (45) Date of Patent: Jun. 21, 2011

(54) METHOD FOR DETERMINING THE HEALTH IMPACT OF AN APPLICATION BASED ON INFORMATION OBTAINED FROM LIKE-PROFILED COMPUTING SYSTEMS USING CLUSTERING

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 730 days.

(21) Appl. No.: 12/056,379

(22) Filed: Mar. 27, 2008

(51) Int. Cl.
*G06F 9/44* (2006.01)
(52) U.S. Cl. ............ 706/52; 717/168; 717/174; 717/124
(58) Field of Classification Search .................... 706/12, 706/20, 45–48, 52, 62; 707/737; 717/124–135, 717/168–178
See application file for complete search history.

(56) References Cited

U.S. PATENT DOCUMENTS

| 7,269,851 | B2 | 9/2007 | Ackroyd | |
|---|---|---|---|---|
| 7,831,412 | B1 | 11/2010 | Sobel | |
| 2003/0229890 | A1* | 12/2003 | Lau et al. ....................... | 717/168 |
| 2004/0230828 | A1* | 11/2004 | DeFuria et al. ................ | 713/200 |
| 2005/0222885 | A1* | 10/2005 | Chen et al. ..................... | 705/8 |
| 2005/0283831 | A1 | 12/2005 | Ryu et al. | |
| 2006/0253584 | A1 | 11/2006 | Dixon et al. | |
| 2007/0074170 | A1* | 3/2007 | Rossmann .................... | 717/127 |
| 2008/0177756 | A1* | 7/2008 | Kosche et al. ................ | 707/100 |
| 2008/0301672 | A1* | 12/2008 | Rao et al. ...................... | 717/177 |
| 2009/0055340 | A1* | 2/2009 | Lakshminarayanan et al. ............................. | 706/47 |

OTHER PUBLICATIONS

Satish, Sourabh; U.S. Appl. No. 11/394,846, filed Mar. 31, 2006.
Satish, Sourabh; U.S. Appl. No. 12/049,751, filed Mar. 17, 2008.
Non-Final Office Action received in USPTO U.S. Appl. No. 11/394,846, filed Mar. 6, 2009.
Final Office Action received in USPTO U.S. Appl. No. 11/394,846, filed Sep. 1, 2009.
Non-Final Office Action received in U.S. Appl. No. 11/394,846, filed Feb. 23, 2010.
Non-Final Office Action received in USPTO U.S. Appl. No. 11/394,846, filed Feb. 23, 2010.
Non-Final Office Action received in USPTO U.S. Appl. No. 11/394,84, filed Dec. 9, 2010.

* cited by examiner

*Primary Examiner* — David R Vincent
(74) *Attorney, Agent, or Firm* — Advantedge Law Group

(57) ABSTRACT

A computer-implemented method for determining the health impact of an application based on information obtained from like-profiled computing systems may comprise: 1) obtaining a plurality of computing-system profiles, 2) obtaining system-health-evaluation results for each of the plurality of computing-system profiles, 3) identifying, by analyzing the plurality of computing-system profiles, a first set of like-profiled computing systems, 4) identifying, by analyzing the plurality of computing-system profiles, a second set of like-profiled computing systems that is substantially identical to the first set of like-profiled computing systems but for a first application installed on the second set of like-profiled computing systems, and 5) determining the health impact of the first application by comparing system-health-evaluation results from the first set of like-profiled computing systems with system-health-evaluation results from the second set of like-profiled computing systems. Corresponding systems and computer-readable media are also disclosed.

8 Claims, 13 Drawing Sheets

| System Profile 400 ||
|---|---|
| Item 406 | Value 408 |
| Processor | x86 Family 6 Model 15 GenuineIntel ~ 2346 Mhz |
| Local Fixed Disk | NTFS: 120 GB (81 GB free) |
| Winsock | winsock.dll v. 3.10 (2.80 KB) |
| Physical Memory | 1.536 GB (996.45 GB free) |
| Virtual Memory | 2.00 GB (1.89 GB free) |
| Page File Space | 3.35 GB |
| Operating System | Microsoft Windows XP Professional, Version 5.1.2600, SP 2, Build 2600 |
| System Drivers | • Microsoft USB Standard Hub Driver ("usbhub"), c:\windows\system32\drivers\usbhub.sys, Kernel Driver, Manual Start Mode, Error Control Running<br>• ... |
| Signed Drivers | • Plug and Play Monitor, Signed, Monitor Class, Version 5.1.2001.0, 6/6/2001, monitor.inf, Device ID: Display\KVM2002\5&3B20608A&0&00000100&01&00<br>• ... |
| Services | • .Net Runtime Optimization Service, v2.0.50727_X86, clr_optimization_v2.0.50727_32, Manual Start Mode, c:\windows\microsoft.net\framework\v2.0.50727\mscorsw.exe, Start Name (LocalSystem)<br>• ... |
| Program Groups | • Group Name: Accessories; Name: All Users; Accessories; User Name: All Users<br>• ... |
| Startup Programs | • PhotoPro Speed Launch, c:\progra~1\photopro\photopro~2.0\reader\reader~1.exe, All Users, Common Startup<br>• ... |
| OLE Registration | • WordPad Document, "%programfiles%\windows nt\accessories\wordpad.exe"<br>• ... |
| Internet Explorer | Version 6.0.2900.2180, Build 62900.2180, C:\Program Files\Internet Explorer, Cipher Strength: 128-bit |
| Internet Explorer File Versions | • actxprxy.dll, 6.0.2900.2180, 100 KB, 8/3/2004, 11:56:41 PM, C:\WINDOWS\system32<br>• ... |
| Internet Explorer Cache | Automatic Page Refresh, Temporary Internet Files Folder: D:\Temp\Temporary Internet Files, Total Disk Space (N/A), Available Disk Space (N/A), Maximum Cache Size (N/A), Available Cache Size (N/A) |
| Internet Explorer Objects | • SDKInstall Class, http://activex.microsoft.com/activex/controls/sdkupdate/sdkinst.cab<br>• ... |
| Internet Explorer Security Settings | My Computer (Custom), Local Intranet (Custom), Trusted Sites (Custom), Internet (Custom), Restricted Sites (Custom) |

402 brackets: Processor, Local Fixed Disk, Winsock, Physical Memory, Virtual Memory, Page File Space 404 brackets: Operating System through Internet Explorer Security Settings

*FIG. 4*

System-Health Evaluation 500

Stability Index 502

| | |
|---|---|
| Running Average of Blue-Screen Errors | 0 |
| Running Average of Service Errors | 1 |
| Running Average of Application Errors | 1 |

504, 506

Performance Index 512

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

First Set of System-Health-Evaluation Results
800

First Stability Index 802

| | |
|---|---|
| Running Average of Blue-Screen Errors | 0 |
| Running Average of Service Errors | 1 |
| Running Average of Application Errors | 1 |

} 804
} 806

First Performance Index 812

| | |
|---|---|
| Running Average of CPU Usage | 2.1875 |
| Maximum CPU Usage | 7 |
| Running Average of Page Faults | 248.4375 |
| Maximum Number of Page Faults | 844 |
| Running Average of IP Datagrams | 3.2500 |
| Maximum Number of IP Datagrams | 8 |

} 814
} 816

Second Set of System-Health-Evaluation Results
820

Second Stability Index 822

| | |
|---|---|
| Running Average of Blue-Screen Errors | 0 |
| Running Average of Service Errors | 2 |
| Running Average of Application Errors | 3 |

} 824
} 826

Second Performance Index 832

| | |
|---|---|
| Running Average of CPU Usage | 10.1999 |
| Maximum CPU Usage | 58 |
| Running Average of Page Faults | 960.8500 |
| Maximum Number of Page Faults | 3423 |
| Running Average of IP Datagrams | 3.2500 |
| Maximum Number of IP Datagrams | 9 |

} 834
} 836

Health-Impact Scores
840

Stability Impact 842

| | |
|---|---|
| Blue-Screen Errors Impact | 0% |
| Service Errors Impact | -50% |
| Application Errors Impact | -50% |

Performance Impact 846

| | |
|---|---|
| Average CPU Usage Impact | -78.5539% |
| Maximum CPU Usage Impact | -87.9130% |
| Average Page Faults Impact | -74.1440% |
| Maximum Page Faults Impact | -75.3433% |
| Average IP Datagrams Impact | 0% |
| Maximum IP Datagrams Impact | -11.1111% |

Average Health Impact 848

| | |
|---|---|
| Average Stability Impact | -33.3333% |
| Average Performance Impact | -55.5109% |
| Average Health Impact | -44.4421% |

FIG. 8

METHOD FOR DETERMINING THE HEALTH IMPACT OF AN APPLICATION BASED ON INFORMATION OBTAINED FROM LIKE-PROFILED COMPUTING SYSTEMS USING CLUSTERING

BACKGROUND

Literally thousands of computer programs and applications are available for installation on modern-day computing devices, such as the personal computer. Unfortunately, a user of a computing device is typically unable to determine whether an application will impact the health (e.g., the performance or stability) of the computing device before installing the application on the computing device. Because vendor-supplied information detailing the potential impact of an application on the health of a computing device may not be reliable, users may turn to elaborate reviews of applications published on the web by professional reviewers or other users of the application. Such reviews, however, suffer from a number of deficiencies.

For example, a review of an application may not detail the impact the application had on the health of the reviewer's computing device. In addition, even if a reviewer wishes to highlight the perceived impact of an application on the health of the reviewer's computing device, the reviewer may have difficulty determining the precise impact the application had on the computing device's health due to the high number of applications typically installed on computing devices. Moreover, reviewers of an application may not be motivated to post a review of an application unless the reviewer experiences (or at least perceives) problems with the application. As such, reviews of an application may wrongly focus on perceived problems or weaknesses of an application.

In the absence of reliable information, users may not become aware of the negative impact of an application until after the application has been installed. Unfortunately, in some instances the negative effects of an application on a computing device may not be reversed simply by uninstalling the application.

SUMMARY

As will be described in greater detail below, embodiments of the instant disclosure may enable a user to precisely determine the potential impact a new application will have on the health of the user's computing system prior to installing the new application. In at least one embodiment, the potential health impact of an application may be determined by comparing health-impact information received from like-profiled computing systems on which the application has been installed with health-impact information received from like-profiled computing systems on which the application has not been installed.

For example, the precise health impact of an application may be determined by: 1) receiving computing-system profiles and system-health-evaluation results from a plurality (potentially millions) of computing systems, 2) identifying (using, for example, clustering technologies) a first set of like-profiled computing systems from within these computing-system profiles, 3) identifying a second set of like-profiled computing systems from within these computing-system profiles that is substantially identical to the first set of like-profiled computing systems but for an application installed on the second set of like-profiled computing systems, and then 4) comparing system-health-evaluation results from the first set of like-profiled computing systems with system-health-evaluation results from the second set of like-profiled computing systems to determine whether the application impacted the health of the second set of like-profiled computing systems.

The computing-system profiles may identify software and/or hardware characteristics of a computing system and may contain a unique identifier (such as a unique license key) that identifies the computing system. In addition, the system-health-evaluation results may contain information that details the current performance or stability of the computing system using various performance or stability metrics, such as the processor, memory, and network usage of the computing system or the number of operating-system, application, service, or device-driver errors experienced by the computing system. In addition, and as will be discussed in greater detail below, the health impact of an application expressed or quantified by a health-impact score.

The first and second sets of like-profiled computing systems may be identified using a variety of clustering or grouping technologies, such as K-means, Sunflower Lemma, Bloom-filters, or any other suitable clustering or grouping technology. In addition, while the first and second sets of like-profiled computing systems typically represent a plurality (e.g., thousands or millions) of like-profiled computing systems, each set may also represent, in some embodiments, a single computing system.

As detailed above, additional embodiments may also enable users to determine the potential impact of a new application on the health of a computing system prior to installing the application based on information obtained from like-profiled computing systems on which the application has previously been installed. In this embodiment, the method may further comprise: 1) receiving a request for health-impact information for an application from a client-side computing system (which request may contain a computing-system profile for the client-side computing system that is substantially identical to a computing-system profile for the first set of like-profiled computing systems), 2) determining the potential impact of the first application on the health of the client-side computing system by comparing system-health-evaluation results from the first set of like-profiled computing systems with system-health-evaluation results from the second set of like-profiled computing systems, and then 3) transmitting a reply to the client-side computing system that contains information that identifies the potential impact of the first application on the health of the client-side computing system. This information may enable a user of the client-side computing device (or a module installed on the client-side computing device) to determine the potential impact of a new application on the health of the client-side computing device prior to installing the new application.

In an additional embodiment, the potential impact of a new application on the health of a computing system may be determined by: 1) creating a profile of the computing system, 2) transmitting the profile of the computing system to a server, 3) detecting a new application, 4) transmitting a request for health-impact information for the new application to the server, and then 5) receiving the health-impact information for the new application from the server that identifies the potential impact of the new application on the health of the computing system. In at least one embodiment, the health-impact information received from the server may be based on information received from like-profiled computing systems on which the application has been installed.

In certain embodiments, the request for health-impact information may contain a unique identifier (such as a name of the application or a checksum calculated for the application's installer) that identifies the application. Upon receiving the health-impact information for the application, the method may further comprise displaying the health-impact information (such as a system-health-impact score for the application) in a user interface (which may be either locally executed or web-based) and then prompting a user to allow or deny installation of the application. Alternatively, the method may further comprise automatically allowing or preventing installation of the application based on the health-impact information received from the server.

The method may also comprise identifying all data, files, and system changes associated with, or that result from installing, the application and then associating these files, data, and system changes with a single file, such as an executable file, associated with the application. In addition, the new application may be detected before the new application is fully installed on the computing system.

The method may also further comprise: 1) performing a first evaluation of the computing system's health, 2) allowing the new application to fully install on the computing system, 3) performing a second evaluation of the computing system's health after the new application is fully installed on the computing system, and then 4) transmitting the results of the first evaluation and the second evaluation to the server. In certain embodiments, the first evaluation may be performed before the new application is fully installed on the system. Similarly, the second evaluation of the system's health may be performed before a second new application is fully installed on the system in order to eliminate additional variables.

The method may also further comprise: 1) detecting a second new application, 2) creating an updated profile of the computing system, 3) performing a third evaluation of the health of the computing system after the second new application is fully installed on the computing system, and then 4) transmitting the results of the third evaluation, along with the updated profile of the computing system, to the server. Corresponding systems and computer-readable media are also disclosed.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of a profile of a computing system that may be generated according to at least one embodiment.

FIG. 5 is a block diagram illustrating the results of an exemplary health evaluation that may be performed according to at least one embodiment.

FIG. 8 is a block diagram illustrating a plurality of system-health evaluations that may be analyzed to determine the health impact of an application according to at least one embodiment.

Figure 1:
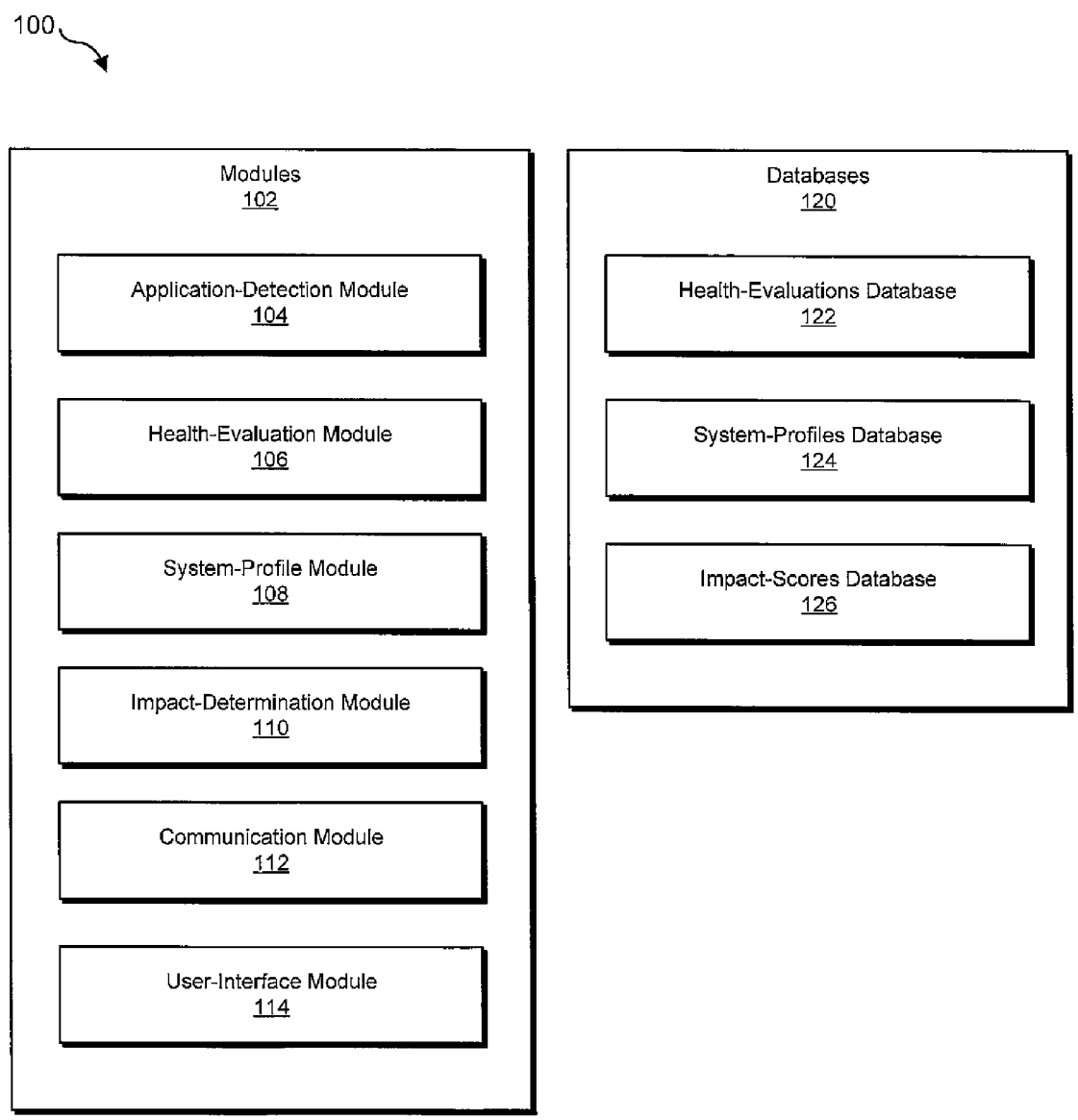
FIG. 1 is a block diagram of an exemplary system for determining the health impact of an application based on information obtained from like-profiled computing systems according to at least one embodiment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for determining the impact of an application on the health of a computing system based on information obtained from like-profiled computing systems. The term "health," as used herein, generally refers to the overall wellness of a computing system. As detailed below, in certain embodiments the health of a computing system may be determined by evaluating the performance, stability, and/or state of security of the computing system.

Figure 2:
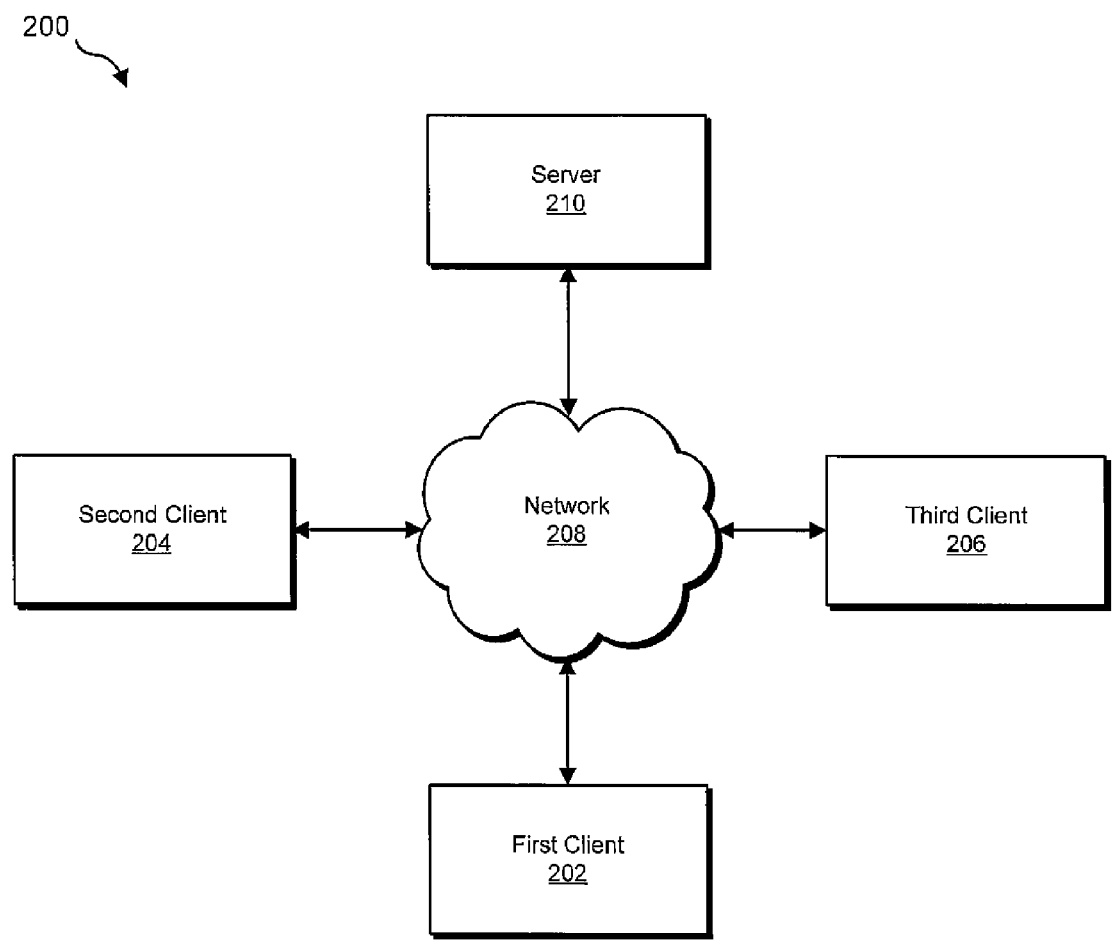
FIG. 2 is a block diagram of an exemplary network-based system for determining the health impact of an application based on information obtained from like-profiled computing systems according to at least one embodiment.
Figure 6:
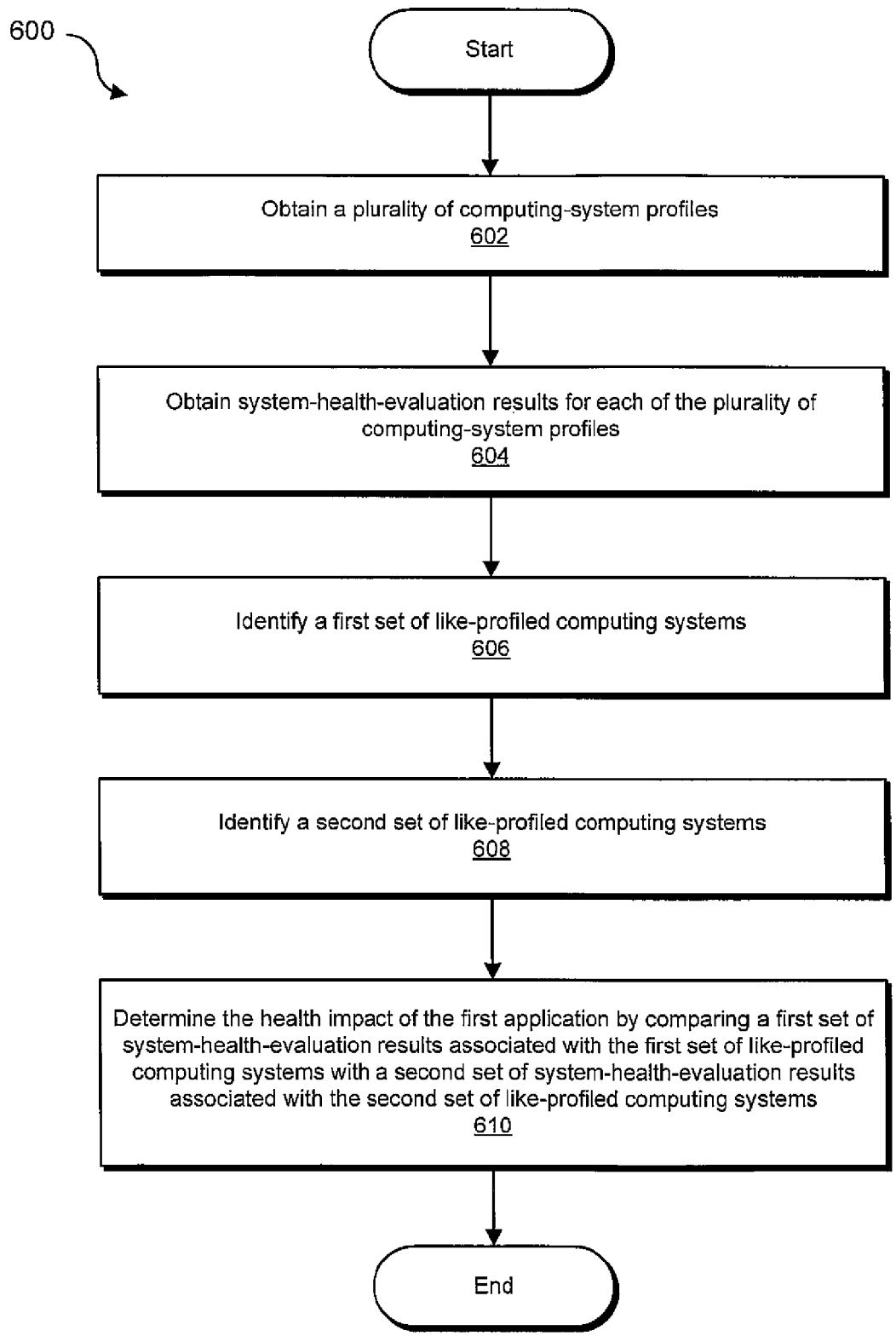
FIG. 6 is a flow diagram of an exemplary computer-implemented method for determining the health impact of an application based on information obtained from like-profiled computing systems according to at least one embodiment.
Figure 7:
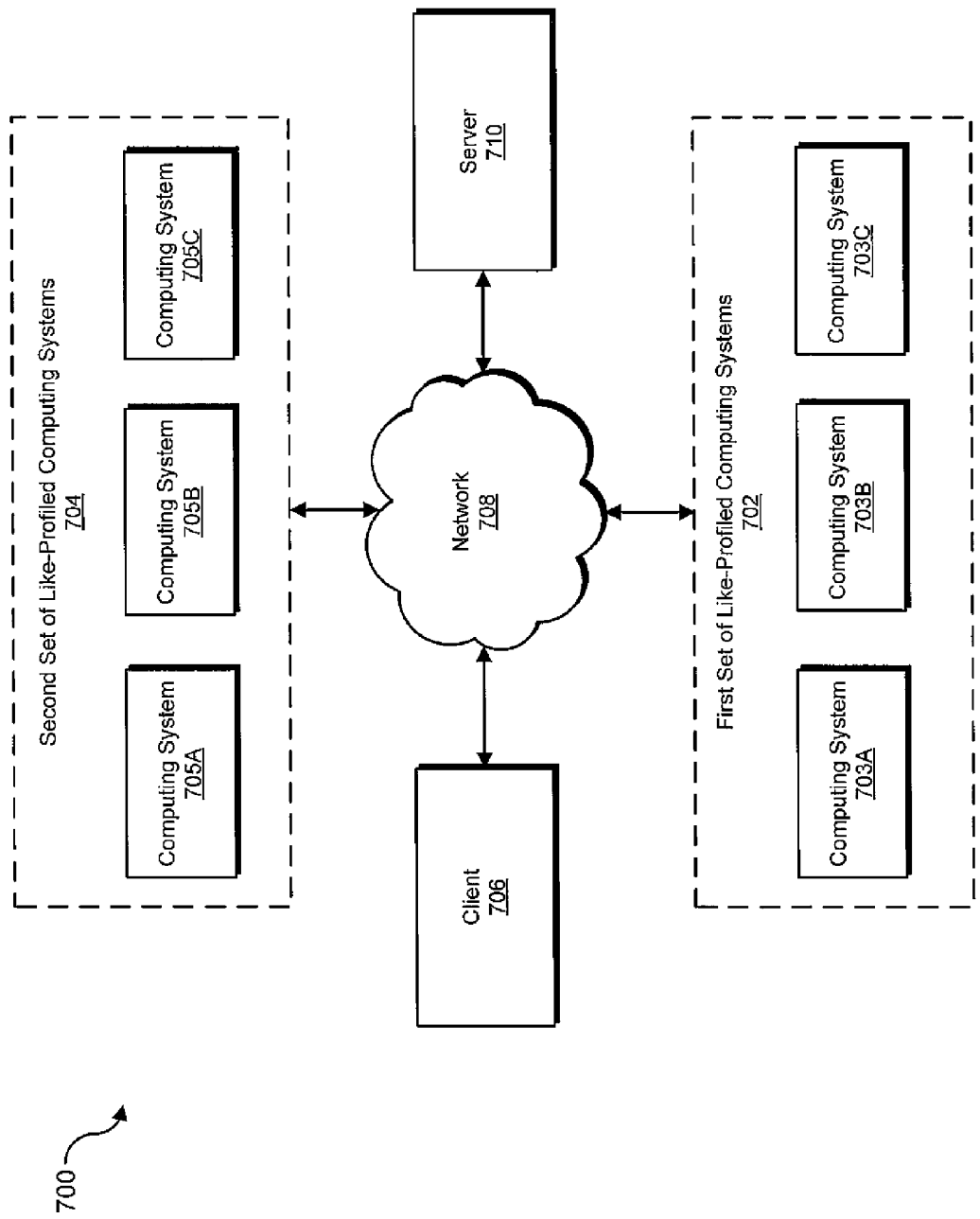
FIG. 7 is a block diagram of an exemplary network-based system for determining the health impact of an application based on information obtained from like-profiled computing systems according to an additional embodiment.

The following will provide, with reference to FIGS. 1, 2, and 7, detailed descriptions of exemplary systems for determining the health impact of an application based on information obtained from like-profiled computing systems. A description of the results of exemplary health evaluations that may be performed by such systems will be provided in connection with FIGS. 5 and 8. In addition, a description of a profile of a computing system that may be generated will be provided in connection with FIG. 4. A description of a corresponding exemplary user interface for use with these systems will be provided in connection with FIG. 11. Detailed descriptions of corresponding exemplary computer-implemented methods will also be provided in connection with FIGS. 3, 6, 9, and 10.

FIG. 1 is a block diagram of an exemplary system 100 for determining the health impact of an application based on information obtained from like-profiled computing systems. As illustrated in this figure, exemplary system 100 may comprise one or more modules 102 for performing one or more tasks. For example, exemplary system 100 may comprise an application-detection module 104 for detecting applications downloaded, stored, loaded onto, or installed on a computing system and a health-evaluation module 106 for evaluating the health of a computing system (hereafter "system-health evaluations").

Exemplary system 100 may also comprise a system-profile module 108 for creating a software and/or hardware profile of a computing system. In addition, as will be described in greater detail below, exemplary system 100 may comprise an impact-determination module 110 for determining, based on health-evaluations results received from a plurality of like-profiled computing systems, the health impact of an application. In addition, exemplary system 100 may comprise a communication module 112 for facilitating communication between a computing system (such as a user's system) and a server or backend and a user-interface module 114 for providing a user interface.

As illustrated in FIG. 1, exemplary system 100 may also comprise one or more databases 120. For example, exemplary system 100 may comprise a health-evaluations database 122 for storing the results of system-health-evaluations performed by health-evaluation module 106. Exemplary system 100 may also comprise a system-profiles database 124 for storing system profiles for one or more computing systems and an impact-scores database 126 for storing scores that represent the health impact of an application (hereafter, "health-impact scores"). As will be described in greater detail below, health-impact scores may be calculated based on information obtained from a plurality of like-profiled computing systems. Although illustrated as separate devices, one or more of databases 120 may represent portions of a single database or a single computing device.

In certain embodiments, one or more of modules 102 may represent one or more software applications or programs that, when executed by a computing device, may cause the computing device to perform one or more tasks required to determine the health impact of an application based on information obtained from like-profiled computing systems. For example, as will be described in greater detail below, one or more of modules 102 may represent software modules configured to run on one or more computing devices, such as clients 202-206 in FIG. 2, server 210 in FIG. 2, computing system 1210 in FIG. 12, and/or portions of exemplary network architecture 1300 in FIG. 13. One or more of modules 102 may also represent all or portions of one or more special-purpose computers configured to perform one or more tasks required to determine the health impact of an application based on information obtained from like-profiled computing systems.

In addition, one or more of databases 120 may represent a portion of one or more computing devices. For example, one or more of databases 120 may represent a portion of clients 202-206 in FIG. 2, server 210 in FIG. 2, exemplary computing system 1210 in FIG. 12, and/or portions of exemplary network architecture 1300 in FIG. 13. Alternatively, one or more of databases 120 may represent one or more physically separate devices capable of being accessed by a computing device, such as clients 202-206 in FIG. 2, server 210 in FIG. 2, computing system 1210 in FIG. 12, and/or portions of exemplary network architecture 1300 in FIG. 13.

Exemplary system 100 in FIG. 1 may be deployed in a variety of ways. For example, all or a portion of exemplary system 100 may represent portions of a network-based system, such as exemplary network-based system 200 in FIG. 2. As illustrated in this figure, exemplary system 200 may comprise a first client 202, a second client 204, a third client 206, and a server 210, each of which may be in communication with one another via a network 208.

Clients 202-206 generally represent client-side computing devices capable of executing computer-readable instructions. In certain embodiments, clients 202-206 may comprise one or more portions of exemplary system 100 in FIG. 1. For example, one or more of modules 102 in FIG. 1 may be stored and configured to run on one or more of clients 202-206. Similarly, one or more of databases 120 in FIG. 1 may represent portions of one or more of clients 202-206 in FIG. 2. In addition, as will be described in greater detail below in connection with FIG. 6, each of clients 202-206 may represent one or more sets of like-profiled computing systems. For example, first client 202 may represent a first set of like-profiled computing systems, second client 204 may represent a second set of like-profiled computing systems, and third client 206 may represent a third set of like-profiled computing systems.

In at least one embodiment, clients 202-206 may communicate with server 210 via network 208. Network 208 generally represents any type or form of communication or computing network; including, for example, an intranet, a wide area network (WAN), a local area network (LAN), a personal area network (PAN), or the Internet.

As illustrated in FIG. 2, exemplary system 200 may also comprise a server 210. Server 210 generally represents any type or form of server-side computing device, such as a backend. In certain embodiments, server 210 may comprise one or more portions of exemplary system 100 in FIG. 1. For example, one or more of modules 102 from FIG. 1 may be stored and configured to run on server 210. Similarly, server 210 may comprise one or more of databases 120 in FIG. 1.

Figure 3:
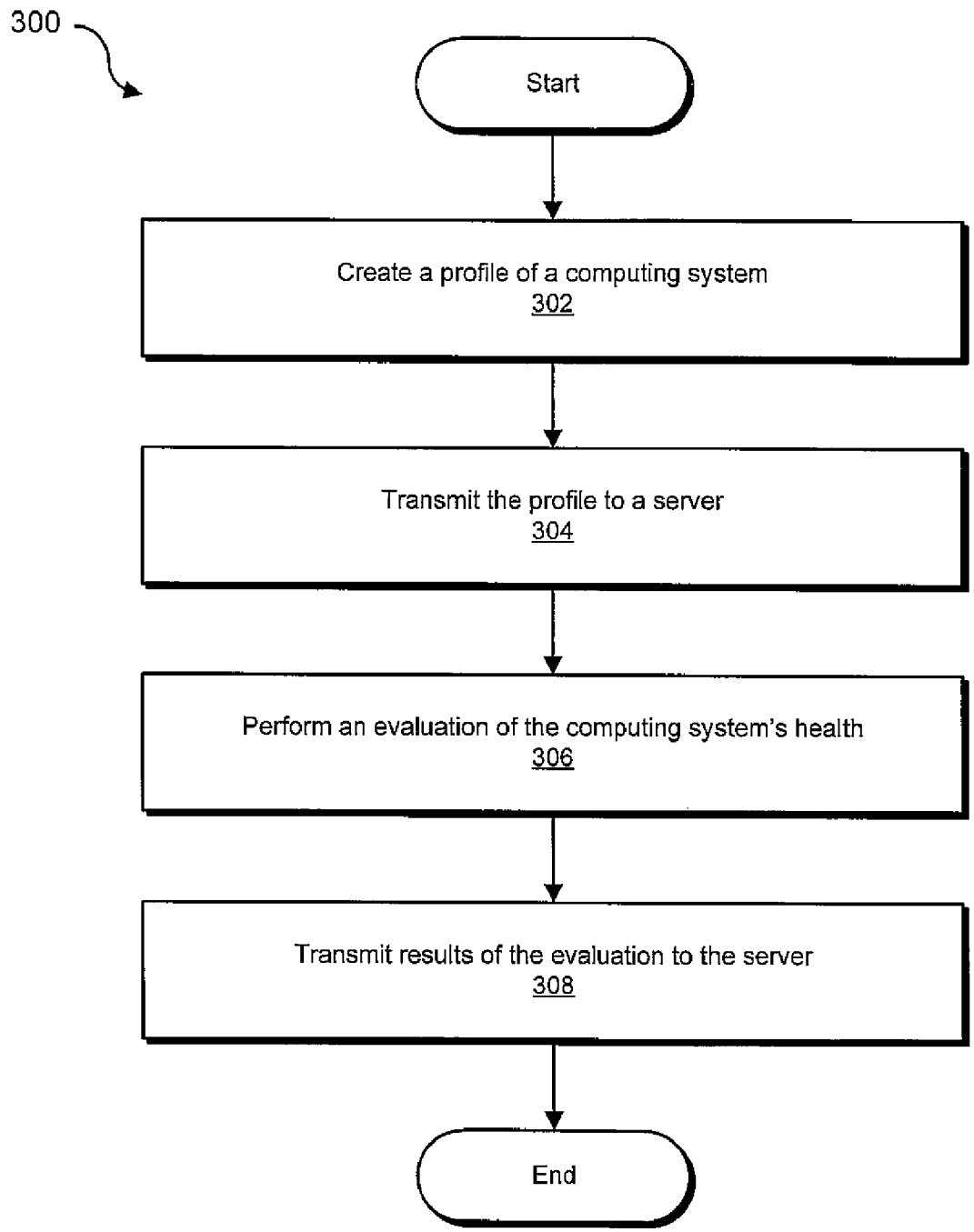
FIG. 3 is a flow diagram of an exemplary computer-implemented method for obtaining and transmitting information to a server that may be used to determine the health impact of an application according to at least one embodiment.

FIG. 3 is a flow diagram of an exemplary computer-implemented method 300 for obtaining, and then transmitting to a server, information that may be used to determine the health impact of an application. As illustrated in this figure, at step 302 a profile of a computing system may be created. For example, system-profile module 108 in FIG. 1 may create a profile of first client 202 in FIG. 2.

The phrase "profile," as used herein, generally refers to any data structure that identifies at least one characteristic of a computing system. In certain embodiments, this profile may identify one or more software or hardware characteristics of the computing system. FIG. 4 provides an illustration of an exemplary profile 400 of a computing system. As illustrated in this figure, system profile 400 may comprise a hardware profile 402 that identifies one or more hardware characteristics of the computing system and a software profile 404 that identifies one or more software characteristics (including characteristics of both application software and system software) of the computing system.

Examples of hardware characteristics that may be identified in hardware profile 402 include, without limitation, the characteristics of one or more processors of a computing system, the characteristics of one or more remote or local discs of a computing system, the characteristics of physical or virtual memory of a computing system, the page-file space of a computing system, or any other potentially useful information.

Similarly, software profile 404 may identify the characteristics of system software (such as an operating system) or application software (such as a word-processing program) installed on the computing system. Examples of software characteristics that may be identified in software profile 404 include, without limitation, operating-system information, service-pack information, driver information, Internet-browser information, security-settings information, application-software information, or any other potentially useful information.

In at least one embodiment, system profile 400 may also comprise a unique identifier used to identify the computing system. The phrase "unique identifier," as used herein, generally refers to any type or form of key or token that may be used to identify a computing system or software installed on the computing system. Examples of unique identifiers include, without limitation, activation keys, license keys, or other tokens used to identify the computing system or to identify a unique copy of profile or health-monitoring software installed on the computing system.

A profile of a computing system, such as system profile 400 in FIG. 4, may be generated or created in a variety of ways. For example, in WINDOWS systems, the command MSINFO32.exe may be used to generate a report that identifies one or more software or hardware characteristics of a computing system. In this example, unnecessary or duplicative information (e.g., user-specific information, such as MAC addresses, IP addresses, etc.) may be removed from such a report prior to storing the report as a profile.

System profiles may be generated and/or transmitted to a server upon the expiration of a predetermined period of time or upon the occurrence of a specified event. For example, system-profile module 108 in FIG. 1 may generate a profile of first client 202 in FIG. 2 when a new application is detected (as explained below in connection with step 1006 of FIG. 10) or when an evaluation of the health of the computing system is performed (as explained below in connection with step 306 in FIG. 3).

Alternatively, system-profile module 108 in FIG. 1 may generate a profile of first client 202 in FIG. 2 periodically, such as every 24 hours. In this embodiment, creating a profile in step 302 may comprise creating an updated profile that identifies any changes made to the most-recent profile created by system-profile module 108. For example, system-profile module 108 in FIG. 1 may, after generating a first profile for first client 202 in FIG. 2, generate a second, updated profile that identifies any profile changes made to first client 202 subsequent to creation of the first profile.

At step 304, the profile of the computing system created in step 302 may be transmitted to a server. For example, communication module 112 in FIG. 1 may transmit system profile 400 in FIG. 4 from first client 202 in FIG. 2 to server 210 via network 208. Server 210 may then store profile 400 in a database, such as system-profiles database 124 in FIG. 1.

At step 306, the current state of health of the computing system may be determined by performing a health evaluation. As will be explained in greater detail below, this health evaluation may be compared with health evaluations obtained from like-profiled computing systems to determine the health impact of an application installed on such like-profiled computing systems. The phrase "health evaluation," as used herein, generally refers to any type or form of evaluation used to determine the health of a computing system. Examples of health evaluations include, without limitation, performance evaluations of a computing system (which may measure the performance of various aspects of the computing system, such as memory usage, CPU usage, and page faults) and stability evaluations of a computing system (which may measure the stability of a computing system by determining, for example, the number of errors encountered by an operating system or an application installed on the computing system).

Step 306 in FIG. 3 may be performed in a variety of ways. For example, health-evaluation module 106 in FIG. 1 may perform an evaluation of the health of first client 202 in FIG. 2 by analyzing the overall stability and performance of first client 202 in FIG. 2. An illustration of the results of such a health evaluation is provided in FIG. 5. As illustrated in this figure, system-health evaluation 500 may comprise a stability index 502 and a performance index 512. In certain embodiments, stability index 502 may comprise a plurality of stability metrics 504 and results 506 for each of these metrics.

Stability metrics 504 generally represent any type or form of metric that may be used to measure the stability of a computing system. Examples of values that stability metrics may measure include, without limitation, operating-system errors (such as blue-screen errors), application errors (such as application hangs or freezes), service errors, device-driver errors, system uptime, and system reboots (such as the number of system reboots per day). In the example provided in FIG. 5, stability index 502 details the average number of blue-screen errors identified by health-evaluation module 106 during the evaluation period (in this case, zero), the average number of service errors identified by health-evaluation module 106 (one), and the average number of application errors identified by health-evaluation module 106 (one).

As with stability index 502, performance index 512 may comprise a plurality of performance metrics 514 and results 516 for each of these metrics. Performance metrics 514 generally represent any type or form of metric that may be used to measure the performance of a computing system. Examples of values that performance metrics may measure include, without limitation, CPU usage, page faults, network usage (such as the number of IP datagrams), and memory usage. As illustrated in FIG. 5, the results 506 and 516 of stability metrics 504 and performance metrics 514, respectively, may be represented using running averages, maximum or peak values, incremental count values, or any other suitable method.

In the example provided in FIG. 5, performance index 512 details the computing system's maximum and average CPU usage during the evaluation period (in this case 7 and 2.1875, respectively), the maximum and average number of page faults experienced by the system during the evaluation period (844 and 248.4375, respectively), and the maximum and average number of IP datagrams sent and received by the system during the evaluation period (8 and 3.25, respectively).

At step 308, the results of the health evaluation performed in step 306 may be transmitted to the server. For example, communication module 112 in FIG. 1 may transmit system-health evaluation 500 in FIG. 5 from first client 202 in FIG. 2 to server 210 via network 208. Server 210 may then store system-health evaluation 500 in a database, such as health-evaluations database 122 in FIG. 1. Upon completion of step 308 in FIG. 3, exemplary method 300 may terminate.

As will be described in greater detail below, a server or backend may analyze information received from a plurality of like-profiled computing systems (e.g., the information obtained and transmitted in exemplary method 300 in FIG. 3) to determine the health impact of one or more applications. FIG. 6 is a flow diagram of an exemplary computer-implemented method 600 for determining the health impact of an application based on information obtained from like-profiled computing systems. As illustrated in this figure, at step 602 a plurality of computing-system profiles may be obtained. For example, a server 710 in FIG. 7 may receive computing-system profiles (such as system profile 400 in FIG. 4) from a plurality of computing systems (e.g., computing systems 703A-703C and 705A-705C) via network 708. In at least one embodiment, server 710 may store these computing-system profiles in a database, such as system-profiles database 124 in FIG. 1.

At step 604, system-health-evaluation results for each of the plurality of computing-system profiles from step 602 may be received. For example, server 710 in FIG. 7 may receive system-health-evaluation results (such as the results for system-health-evaluation 500 in FIG. 5) from computing systems 703A-703C and 705A-705C via network 708. In at least one embodiment, server 710 may store these system-health-evaluation results in a database, such as health-evaluations database 122 in FIG. 1.

At step 606, a first set of like-profiled computing systems may be identified by analyzing the computing-system profiles received in step 604. For example, server 710 in FIG. 7 may, upon analyzing the plurality of computing-system profiles received from computing systems 703A-703C and 705A-705C in step 604, determine that the computing-system profiles received from computing systems 703A-703C are substantially identical to one another. In this example, server 710 may group or cluster each of the computing-system profiles received from computing systems 703A-703C into a first set of like-profiled computing systems.

At step 608, a second set of like-profiled computing systems may be identified by analyzing the plurality of computing-system profiles obtained in step 602. For example, server 710 in FIG. 7 may, upon analyzing the plurality of computing-system profiles received from computing systems 705A-705C, determine that each of these computing-system profiles are substantially identical to one another. In this example, server 710 may group or cluster each of the computing-system profiles received from computing systems 705A-705C into a second set of like-profiled computing systems. Computing systems or profiles for computing systems may be grouped or clustered in a variety of ways. For example, a server may cluster or group a plurality of computing systems using any suitable grouping or clustering technology, heuristic, or algorithm, including, without limitation, K-means, Sunflower Lemma, Bloom-filters, or any other suitable clustering or grouping technology.

In at least one embodiment, the second set of like-profiled computing systems identified in step 608 may be substantially identical to the first set of like-profiled computing systems identified in step 606, but for a first or "test" application installed on the second set of like-profiled computing systems. For example, the computing-system profiles received from computing systems 703A-703C may be substantially identical to the computing-system profiles received from computing systems 705A-705C, with the exception of a unique or test application (such as the application "TEST_PROG.exe") present in each of the computing-system profiles received from each of computing systems 705A-705C.

At step 610, the health impact of the first or test application may be determined by comparing system-health-evaluation results received from the first set of like-profile computing systems with system-health-evaluation results received from the second set of like-profiled computing systems. FIG. 8 is an illustration of a first set of system-health-evaluation results 800 that may be received from a first set of like-profiled computing systems and a second set of system-health-evaluation results 820 that may be received from a second set of like-profiled computing systems. In at least one embodiment, the first set of system-health-evaluation results 800 may represent an average of the results of each system-health-evaluation received from each computing system within a first set of like-profiled computing systems, such as computing systems 703A-703C in the first set of like-profiled computing systems 702 in FIG. 7.

In this example, first stability index 802 may detail the average number of blue-screen errors reported in the system-health-evaluations received form the first set of like-profiled computing systems 702 (in this case, zero), the average number of service errors reported in the system-health evaluations received from the first set of like-profiled computing systems 702 (one), and the average number of application errors reported in the system-health-evaluations received from the first set of like-profiled computing systems 702 (one).

Similarly, first performance index 812 may detail overall averages for maximum and average CPU usage (in this case, 7 and 2.1875, respectively), maximum and average number of page faults (844 and 248.4375, respectively), and maximum and average number of IP datagrams (8 and 3.25, respectively) reported in the system-health evaluations received from the first set of like-profiled computing systems 702.

As with the first set of system-health-evaluation results 800, the second set of system-health-evaluation results 820 may represent an average of the results of each system-health-evaluation received from each computing system within a second set of like-profiled computing systems, such as computing systems 705A-705C in the second set of like-profiled computing systems 704 in FIG. 7. As detailed above, the first set of like-profiled computing systems 702 in FIG. 7 may be substantially identical to the second set of like-profiled computing systems 704 but for a first or test application installed on each computing system 705A-705C within the second set of like-profiled computing systems 704.

In this example, second stability index 822 may detail the average number of blue-screen errors (in this case, zero), service errors (two), and application errors (three) reported in the system-health evaluations received form the second set of like-profiled computing systems 704. Similarly, second performance index 832 may detail overall averages for maximum and average CPU usage (58 and 10.1999, respectively), maximum and average number of page faults (3423 and 960.85, respectively), and maximum and average number of IP datagrams (9 and 3.25, respectively) reported in the system-health evaluations received from the second set of like-profiled computing systems 704.

Returning to FIG. 6, at step 610 the health impact of the first or test application installed on each of the computing systems within the second set of like-profiled computing systems (i.e., computing systems 705A-705C within the second set of like-profiled computing systems 704) may be determined by comparing the first set of system-health-evaluation results 800 with the second set of system-health evaluation results 820. Step 610 may be performed in a variety of ways. For example, in certain embodiments, impact-determination module 110 in FIG. 1 may compare the first set of system-health-evaluation results 800 with the second set of system-health-evaluation results 820 to determine whether the first or test application installed on computing systems 705A-705C negatively impacted the health (e.g., the stability or performance) of computing systems 705A-705C. Upon completion of step 610 in FIG. 6, exemplary method 600 may terminate.

The health impact of an application may be expressed or quantified in a variety of ways. In certain embodiments, one or more health-impact scores, such as health-impact scores 840 in FIG. 8, may be calculated based on the first set of system-health-evaluation results 800 and the second set of system-health-evaluation results 820. As illustrated in FIG. 8, health-impact scores 840 may represent the impact an application has on the stability (as represented by the results contained in stability-impact table 842) and performance (as represented by the results contained in performance-impact table 846) of a system. For example, the results in stability-impact table 842 may demonstrate whether there has been a percentage increase in blue-screen errors, service errors, and/or application errors on computing systems 705A-705C due to installation of the first or test application. Similarly, the results in performance-impact table 846 may demonstrate whether there has been a percentage increase in CPU usage, memory usage, page faults, and/or network usage on computing systems 705A-705C due to installation of the first or test application.

For example, the results contained in stability-impact table 842 in FIG. 8 demonstrate that computing systems on which the first or test application has been installed (e.g., computing systems 705A-705C in the second set of like-profiled computing systems 704) experience, on average, a 50% increase in the average number of service and application-related errors. Similarly, the results contained in performance-impact table 846 demonstrate that computing systems on which the first or test application has been installed (e.g., computing systems 705A-705C in the second set of like-profiled computing systems 704 in FIG. 7) experience a significant increase in average CPU usage (78.5539%), maximum CPU usage (87.9130%), average number of page faults (74.1440%), maximum number of page faults (75.3433%), and maximum number of IP datagrams (11.1111%).

In at least one embodiment, an average stability-impact score may be calculated for the test application by averaging the results contained in stability-impact table 842 (which, in the example illustrated in FIG. 8, results in an average stability-impact score of −33.3333%). Similarly, an average performance-impact score for the test application may be calculated by averaging the results contained in performance-impact table 846 (which, in the example illustrated in FIG. 8, result in an average performance-impact score of −55.5109%). An overall health-impact score for the test application may then be calculated by averaging the average-stability-impact score with the average-performance-impact score (which, in the example illustrated in FIG. 8, result in an overall health-impact score of −44.4421%). In at least one embodiment, one or more of health-impact score 840 in FIG. 8 may be stored in a database, such as impact-scores database 126 in FIG. 1.

As detailed above, the health impact of an application may be expressed or quantified in a variety of ways. As such, while the system-health evaluations and results illustrated in FIGS. 5 and 8 have been described with a certain degree of particularity, the health impact of an application may be calculated using any number of additional heuristics, formulas, or methods.

As detailed above, the first set of system-health-evaluation results 800 may represent averages of system-health-evaluation results received from a plurality (potentially millions) of like-profiled computing systems. Similarly, the second set of system-health-evaluation results 820 may represent averages of system-health-evaluation results received from a plurality (potentially millions) of like-profiled computing systems that are substantially identical to the first set of like-profiled computing systems, with the exception of a single (or test) application installed on each computing system within the second set of like-profiled computing systems. As such, exemplary method 600 in FIG. 6 may result in a precise determination of the health impact of an application.

Figure 9:
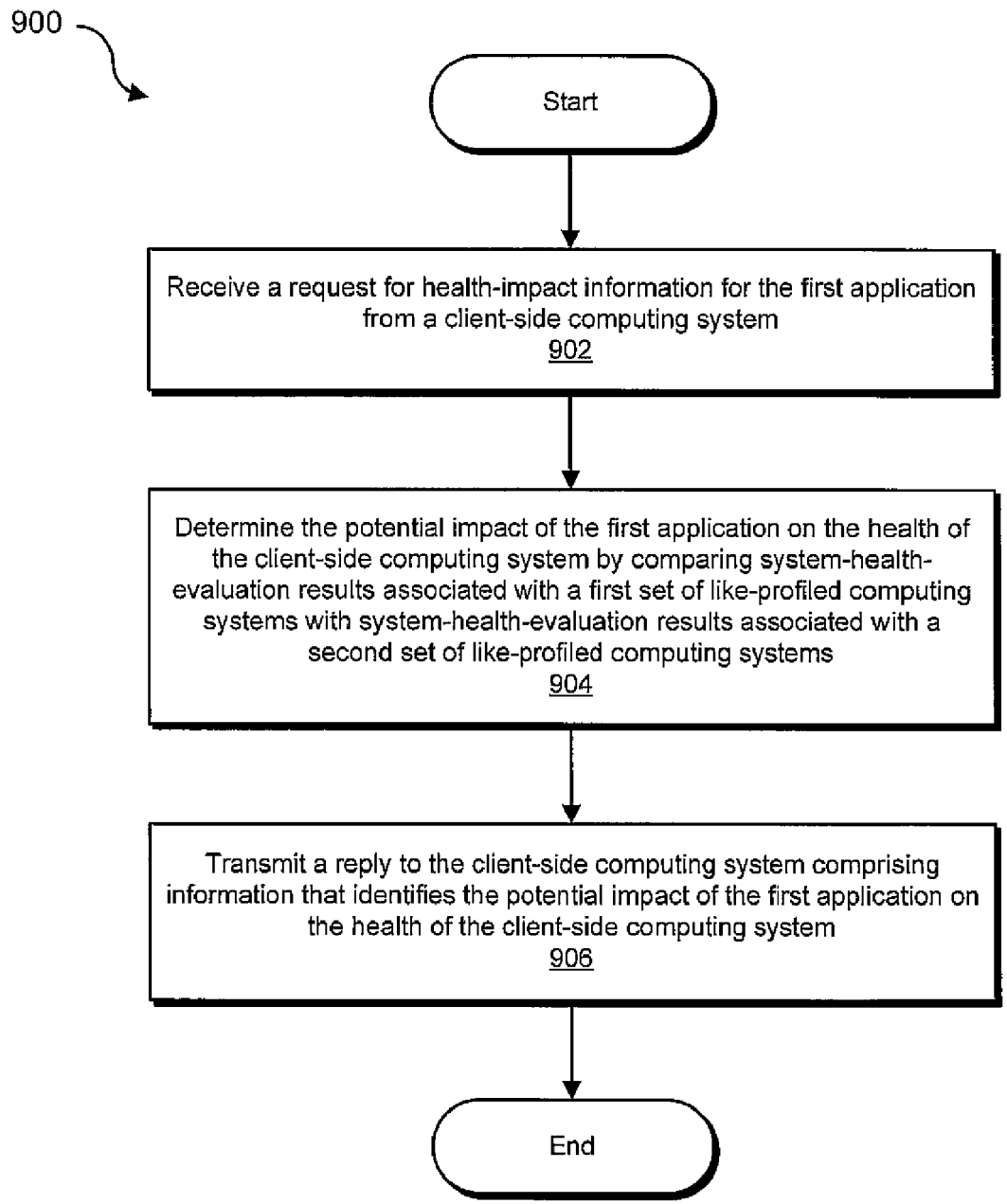
FIG. 9 is a flow diagram of an exemplary computer-implemented method for providing health-impact information for an application to a client-side computing device according to at least one embodiment.

As detailed above, embodiments of the instant disclosure may involve providing access to information that identifies the health impact of an application. FIG. 9 is a flow diagram of an exemplary computer-implemented method 900 for providing a client-side computing system with access to information that identifies the health impact of an application. As illustrated in this figure, a request for health-impact information for an application may be received from a client-side computing system. For example, server 710 in FIG. 7 may receive a request for health-impact information for an application from client 706 via network 708.

In at least one embodiment, the request received in step 902 may comprise a profile of the client-side computing system. As detailed above, this profile may identify one or more software and/or hardware characteristics of the client-side computing system. In certain embodiments, the computing-system profile for the client-side computing system may be substantially identical to a computing-system profile for the first set of like-profile computing systems identified in step 606 in FIG. 6.

At step 904, the potential impact of the first application on the health of the client-side computing system may be determined by comparing system-health-evaluation results received from a first set of like-profiled computing systems (such as the first set of system-health-evaluation results 800 in FIG. 8 received from the first set of like-profiled computing systems 702 in FIG. 7) with system-health-evaluation results received from a second set of like-profiled computing systems (such as the second set of system-health-evaluation results 820 in FIG. 8 received from the second set of like-profiled computing systems 704 in FIG. 7). In at least one embodiment, the second set of like-profiled computing systems may be substantially identical to the first set of like-profiled computing systems, but for the first application that is installed on each computing system within the second set of like-profiled computing systems.

At step 906, a reply may be transmitted to the client-side computing system that contains information that identifies the potential impact of the first application on the health of the client-side computing system. For example, communication module 112 in FIG. 1 may cause server 710 in FIG. 7 to transmit a reply to client 706 that contains information that identifies one or more health-impact scores (such as health-impact scores 840 in FIG. 8) for the application identified in step 902. As detailed above, in at least one embodiment this information may be used to determine whether to install the application on client 706.

Figure 10:
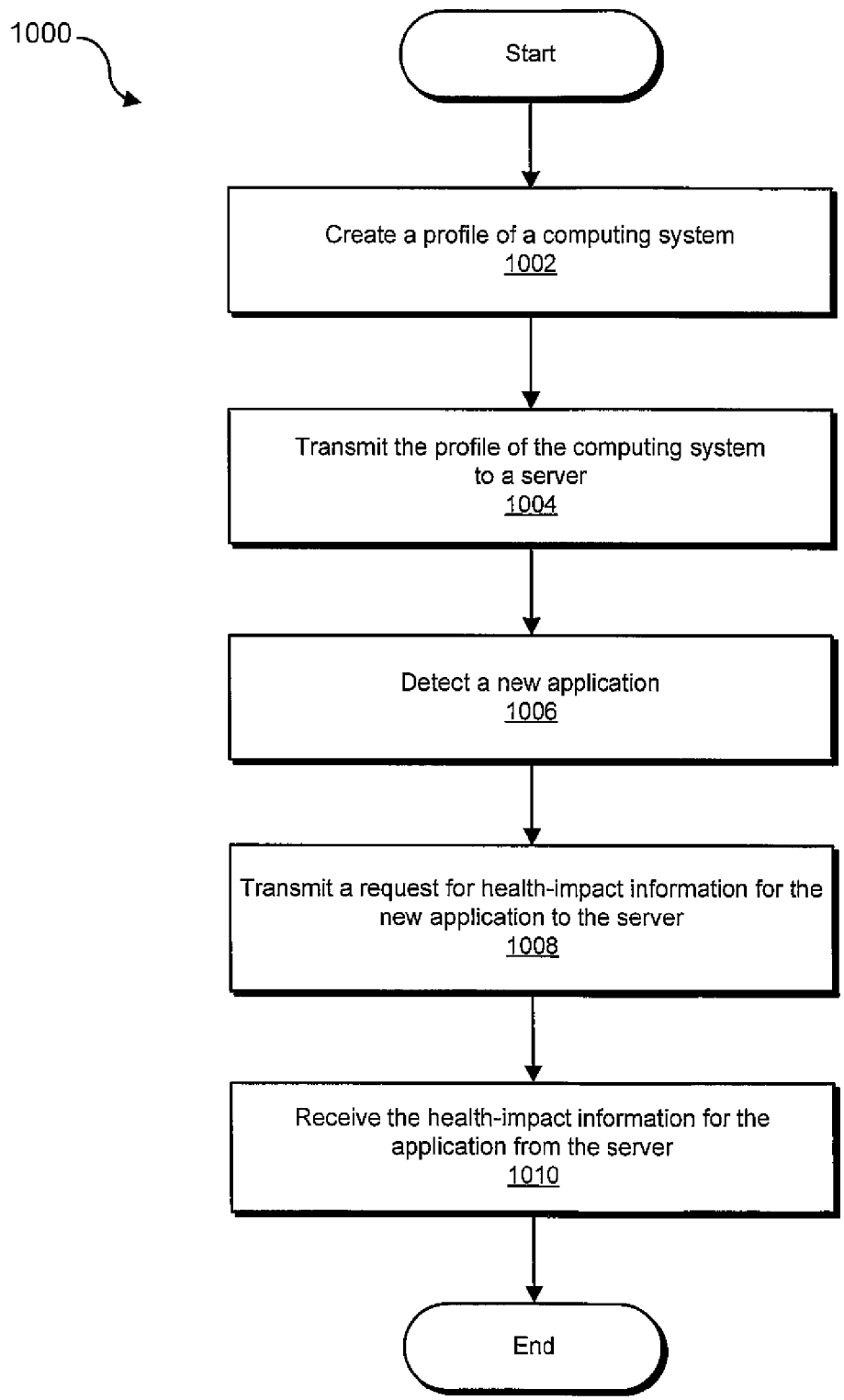
FIG. 10 is a flow diagram of an exemplary computer-implemented method for determining the potential impact of an application on the health of a computing system according to at least one embodiment.

As detailed above, embodiments of the instant disclosure may enable a user to determine the potential impact of a new application on the health of the user's computing system prior to fully installing the new application. FIG. 10 is a flow diagram of an exemplary computer-implemented method 1000 for determining the potential impact of a new application on the health of a computing system. As illustrated in this figure, at step 1002 a profile of a computing system may be created. For example, system-profile module 108 in FIG. 1 may create a profile (such as system profile 400 in FIG. 4) of first client 202 in FIG. 2.

At step 1004, the profile of the computing system created in step 1002 may be transmitted to a server. For example, communication module 112 in FIG. 1 may transmit system profile 400 in FIG. 4 from first client 202 in FIG. 2 to server 210 via network 208. In certain embodiments, and as detailed above, the profile transmitted in step 1004 may comprise a unique identifier (such as an activation or license key) for the computing system.

At step 1006, a new application may be detected. For example, application-detection module 104 in FIG. 1 may detect a new application downloaded onto, loaded onto, or stored on first client 202 in FIG. 2. The phrase "application," as used herein, generally refers to any type or form of application software, including installation applications and installers.

New applications may be detected in a variety of ways. For example, in certain embodiments application-detection module 104 in FIG. 1 may detect a new application by file type (e.g., MSI), by name (e.g., setup.exe or install.exe), or by determining the source of the file (e.g., internet browser, e-mail client, etc.). In at least one embodiment, detecting a new application in step 1006 may also comprise identifying all data, files, and system changes associated with, or that result from installing, the new application. For example, application-detection module 104 in FIG. 1 may detect: 1) all shared and non-shared program files created or modified by the new application, 2) all folders and directories created or modified by the new application, 3) any registry entries created or modified by the new application, 4) any configuration file entries created or modified by the new application, 5) any environment variables created or modified by the new application, and/or 6) any links or shortcuts created by the new application.

In addition, in certain embodiments all data, files, and system changes associated with or that result from installing a new application may, after being identified, be associated with a single file, such as an executable file, associated with the new application. For example, application-detection module 104 in FIG. 1 may, after identifying all data, files, and system changes associated with or that result from installing the application "MYPROG," associate each of these data, files, and system changes with the installation file "myprog_setup.exe" for the application "MYPROG." In certain embodiments, such an association may enable system 100 in FIG. 1 to accurately determine and track the impact of a single application, even if installation of the single application results in the creation of numerous files or system changes.

Applications may be detected either prior to being installed on a system or shortly after being installed on a system. For example, application-detection module 104 may detect a new application that is downloaded to, stored on, or loaded onto first client 202 before the application is fully installed on first client 202. In alternative embodiments, application-detection module 104 may detect a new application shortly after the application is fully installed on first client 202. In at least one embodiment, application-detection module 104 in FIG. 1 may also determine whether an application downloaded to, stored on, loaded onto, or installed on first client 202 modified at least one setting of first client 202.

In certain embodiments, detecting a new application in step 1006 may comprise identifying a unique identifier for the new application. Examples of unique identifiers for applications include, without limitation, file names, file paths, file-version information, parent-process file names and paths, checksums or hashes of the same, and the like. Unique identifiers for applications may be identified in a variety of ways. For example, application-detection module 104 in FIG. 1 may identify a unique identifier associated with an application downloaded to first client 202 in FIG. 2 by identifying the name of the application, calculating a hash or checksum for an installer for the application, or the like.

In one embodiment, applications or files that are beyond the control of a user may be ignored or excluded from detection in step 1006. For example, application-detection module 104 in FIG. 1 may ignore operating-system-specific applications or files (e.g., operating-system updates, such as WINDOWS UPDATE) or children of applications or files that are launched or installed on a user's computing system without the user's consent or control. In certain embodiments, excluding such applications or files from detection in step 1006 in FIG. 10 may prevent exemplary system 100 from analyzing the health impact of applications or files that will affect the health of a user's computing device regardless of any action taken by the user.

At step 1008, a request for health-impact information for the new application detected in step 1006 may be transmitted to the server. For example, communication module 112 in FIG. 1 may, after application-detection module 104 in FIG. 1 detects a new application, transmit a request for health-impact information for the new application to server 210 in FIG. 2 via network 208. In at least one embodiment, this request may contain a unique identifier associated with the new application (such as the name and version of the detected application).

In certain embodiments, steps 1004 and 1008 may occur simultaneously. That is, communication module 112 in FIG. 1 may transmit a profile of the computing system along with a request for health-impact information for the new application detected in step 1006 simultaneously to the server.

At step 1010, health-impact information for the new application may be received from a server or backend. The phrase "health-impact information" may refer to any information that may be used to determine the potential impact of an application on the health of a computing system. Examples of health-impact information include, without limitation, one or more health-impact scores (such as health-impact scores 840 in FIG. 8) for the application or any other potentially useful information.

In at least one embodiment, the health-impact information received in step 1010 may be based on at least one characteristic of the profile of the computing system. For example, server 210 in FIG. 2 may, upon receiving a request for health-impact information for an application from first client 202 in FIG. 2, identify (by analyzing the profiles stored in system-profiles database 124 in FIG. 1) a first set of like-profiled computing systems that have profiles that are substantially identical to the profile of first client 202. Server 210 may then identify (again by analyzing the profiles stored in system-profiles database 124 in FIG. 1) a second set of like-profiled computing systems that have profiles that are substantially identical to the profile of first client 202, but for the presence of the application detected in step 1006.

Server 210 may then determine the potential health impact of the application on first client 202 by comparing system-health evaluation results received from the first set of like-profiled computing systems with system-health evaluation results received from the second set of like-profiled computing systems. In certain embodiments, this determination may involve calculating one or more health-impact scores, such as health-impact scores 840 in FIG. 8. Server 210 may then transmit these health-impact scores for the application to first client 202 via network 208. Upon completion of step 1010 in FIG. 10, exemplary method 1000 may terminate.

As detailed above, the health-impact information received in step 1010 may be used to determine whether to install the application on the computing system. For example, in one embodiment the health-impact information received in step 1010 may be displayed to a user and the user may be prompted to allow or deny installation of the application.

Figure 11:
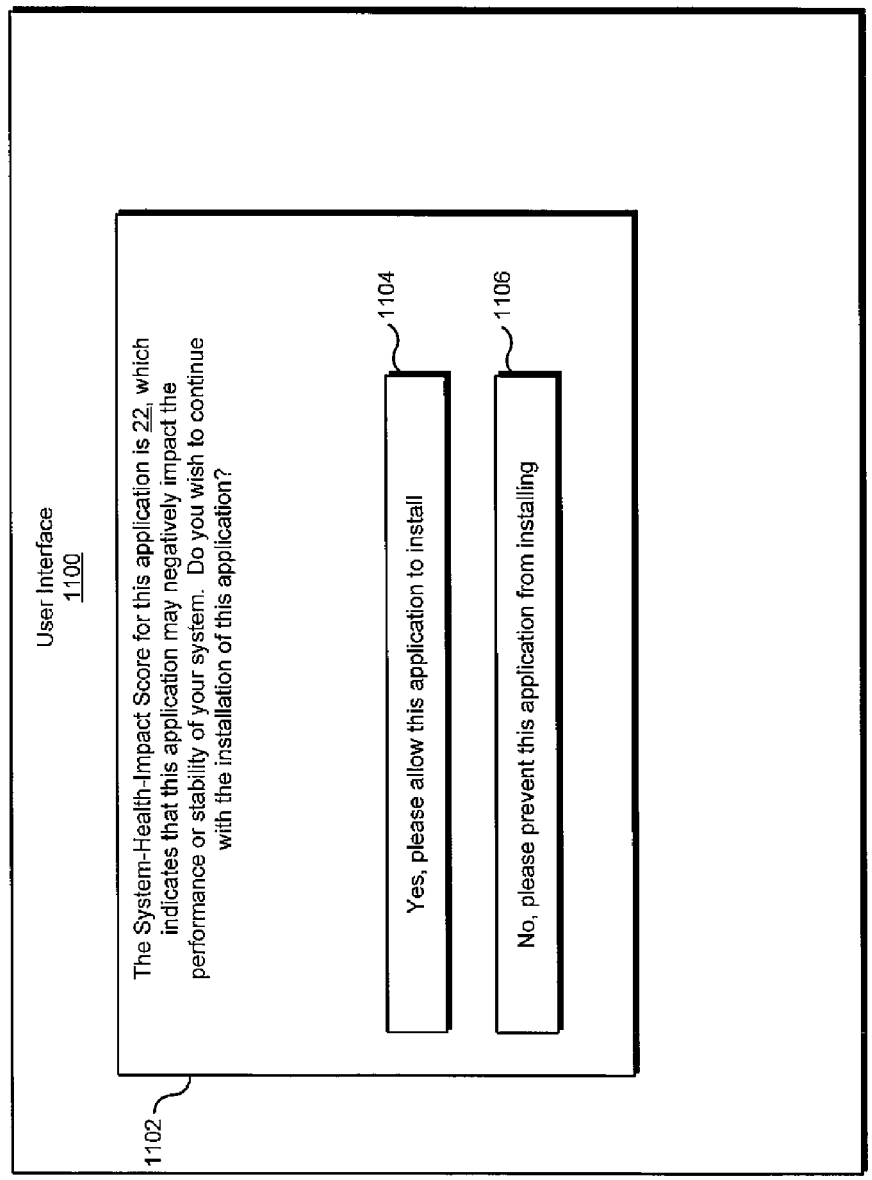
FIG. 11 is a block diagram of an exemplary user interface according to at least one embodiment.

For example, user-interface module 114 in FIG. 1 may provide a user interface, such as user interface 1100 in FIG. 11, for displaying health-impact information for an application to a user. As illustrated in FIG. 11, user interface 1100 may comprise an explanatory textbox 1102 and one or more user-selectable objects 1104 and 1106. In one example, explanatory textbox 1102 may display at least a portion of the health-impact information received from the server in step 1010. For example, explanatory textbox 1102 may display a health-impact score for an application. After reviewing the health-impact information displayed in explanatory textbox 1102, a user may allow the application to be installed on the computing system by selecting user-selectable object 1104. Alternatively, if the user wishes to prevent the application from being installed on the computing system, then the user may select user-selectable object 1106.

User interface 1100 in FIG. 11 generally represents any type or form of user interface. Examples of user interface 1100 include, without limitation, a graphical user interface executed by a client-side computing device, such as first client 202 in FIG. 2, a website hosted by a server-side computing device, such as server 210 in FIG. 2, or any other suitable user interface.

In an additional embodiment, impact-determination module 110 in FIG. 1 may automatically determine whether to install the subject application based on the health-impact information received from the server in step 1010. In this embodiment, impact-determination module 110 in FIG. 1 may determine whether the health-impact information received from the server in step 1010 satisfies predetermined criteria. For example, impact-determination module 110 may determine whether a health-impact score for the application received from server 210 in FIG. 2 exceeds a predetermined threshold, such as 50%. If the health-impact score is less than this predetermined threshold, then impact-determination module 110 may prevent the application from installing on the computing system. However, if the health-impact score for the application exceeds this predetermined threshold, then impact-determination module 110 may allow the application to be installed on the computing system.

Although not illustrated in FIG. 10, in certain embodiments exemplary method 1000 may further comprise performing a first evaluation of the computing system's health. For example, health-evaluation module 106 in FIG. 1 may perform a first health evaluation (such as system-health evaluation 500 in FIG. 5) of first client 202 in FIG. 2. In certain embodiments, the first evaluation may be performed before the application detected in step 1006 is fully installed on the computing system. In alternative embodiments, this first evaluation may be performed immediately after the application is fully installed on the system.

After the first evaluation is performed, the application detected in step 1006 may be installed on the computing system. The term "installation," as used herein, generally refers to the act of loading an application onto a computing system so that it can be executed. In certain embodiments, an application may be installed using a formal installer that may automatically perform various functions necessary to allow the application to be executed, such as unpacking files associated with the application, changing various system settings on the computing system, and the like. In alternative embodiments, an application may be installed simply by copying an application's files to a desired location on the computing system.

After the application is fully installed, a second evaluation of the computing system's health may be performed. For example, health-evaluation module 106 in FIG. 1 may, after a new application is fully installed on first client 202, perform a second health evaluation of first client 202. The results of both the first evaluation and the second evaluation may then be transmitted to a server. As detailed above, this information may be used by the server, in combination with similar information received from additional like-profiled computing systems, to determine the precise health impact of the subject application.

Although not illustrated, exemplary method 1000 may also further comprise: 1) detecting a second, new application, 2) creating an updated profile of the computing system, 3) allowing the second new application to fully install on the computing system, 4) performing a third evaluation of the health of the computing system after the second new application is fully installed on the computing system, and then 5) transmitting the results of the third evaluation, along with the updated profile, to the server or backend. In certain embodiments, and as detailed above, the updated profile may identify any profile changes made to first client 202 subsequent to creation of an original profile. As detailed above, this information may be used by the server, in combination with similar information received from additional like-profiled computing systems, to determine the precise health impact of the second new application.

Figure 12:
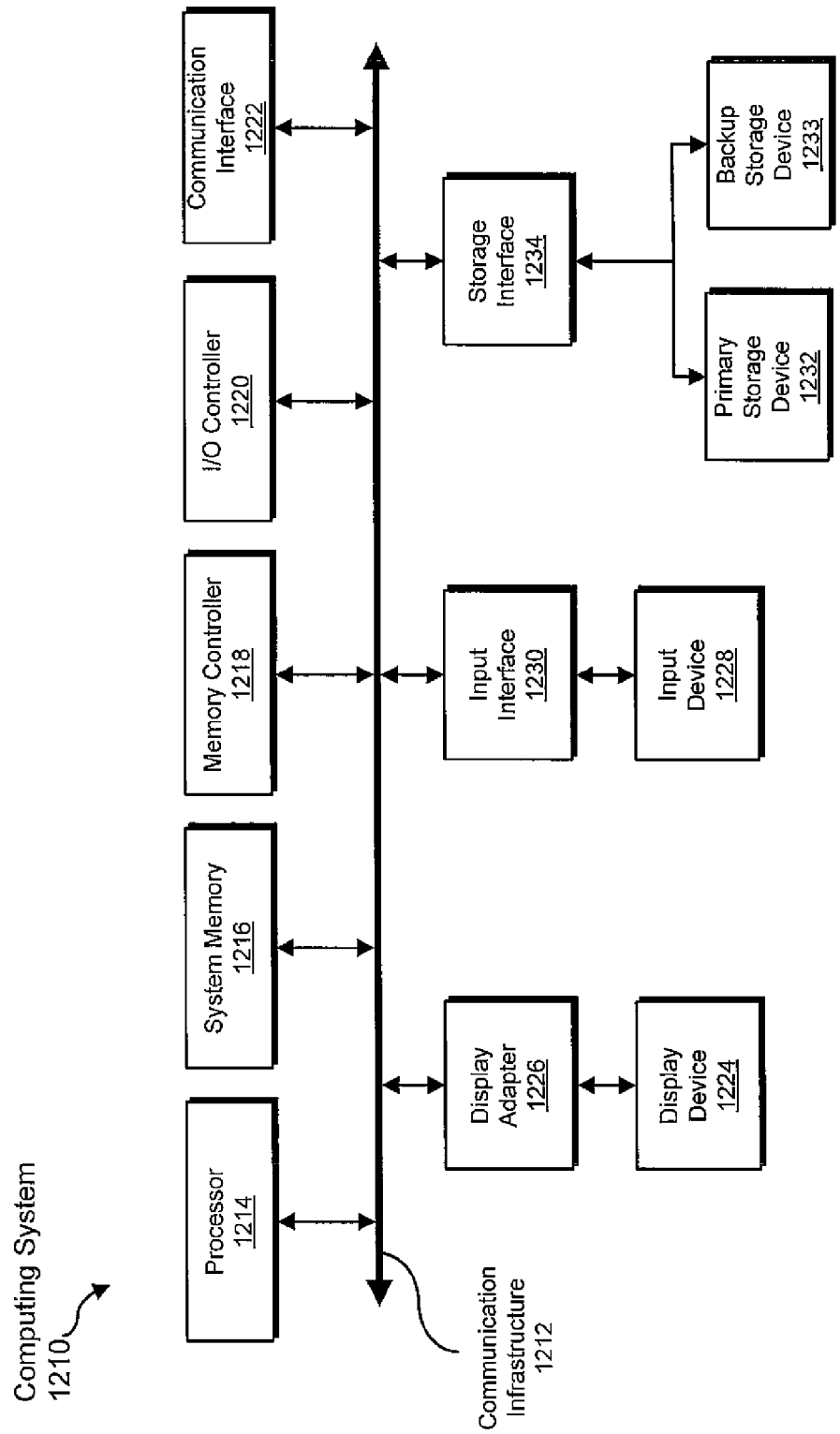
FIG. 12 is a block diagram of an exemplary computing system capable of implementing one or more of the embodiments described and/or illustrated herein.

FIG. 12 is a block diagram of an exemplary computing system 1210 capable of implementing one or more of the embodiments described and/or illustrated herein. Computing system 1210 broadly represents any single or multi-processor computing device or system capable of executing computer-readable instructions. Examples of computing system 1210 include, without limitation, workstations, laptops, client-side terminals, servers, distributed computing systems, handheld devices, or any other computing system or device. In its most basic configuration, computing system 1210 may comprise at least one processor 1214 and a system memory 1216.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the exemplary embodiments described and/or illustrated herein. For example, processor 1214 may perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps described herein. Processor 1214 may also perform and/or be a means for performing any other steps, methods, or processes described and/or illustrated herein.

System memory 1216 generally represents any type or form of volatile or non-volatile storage device or medium capable of storing data and/or other computer-readable instructions. Examples of system memory 1216 include, without limitation, random access memory (RAM), read only memory (ROM), flash memory, or any other suitable memory device. Although not required, in certain embodiments computing system 1210 may comprise both a volatile memory unit (such as, for example, system memory 1216) and a non-volatile storage device (such as, for example, primary storage device 1232, as described in detail below).

In certain embodiments, exemplary computing system 1210 may also comprise one or more components or elements in addition to processor 1214 and system memory 1216. For example, as illustrated in FIG. 12, computing system 1210 may comprise a memory controller 1218, an Input/Output (I/O) controller 1220, and a communication interface 1222, each of which may be interconnected via a communication infrastructure 1212. Communication infrastructure 1212 generally represents any type or form of infrastructure capable of facilitating communication between one or more components of a computing device. Examples of communication infrastructure 1212 include, without limitation, a communication bus (such as an ISA, PCI, PCIe, or similar bus) and a network.

Memory controller 1218 generally represents any type or form of device capable of handling memory or data or controlling communication between one or more components of computing system 1210. For example, in certain embodiments memory controller 1218 may control communication between processor 1214, system memory 1216, and I/O controller 1220 via communication infrastructure 1212. In certain embodiments, memory controller 1218 may perform and/or be a means for performing, either alone or in combination with other elements, one or more of the steps or features described and/or illustrated herein, such as creating, transmitting, detecting, receiving, displaying, prompting, determining, allowing, preventing, performing, identifying, obtaining, analyzing, comparing, calculating, and providing.

I/O controller 1220 generally represents any type or form of module capable of coordinating and/or controlling the input and output functions of a computing device. For example, in certain embodiments I/O controller 1220 may control or facilitate transfer of data between one or more elements of computing system 1210, such as processor 1214, system memory 1216, communication interface 1222, display adapter 1226, input interface 1230, and storage interface 1234. I/O controller 1220 may be used, for example, to perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps described herein. I/O controller 1220 may also be used to perform and/or be a means for performing other steps and features set forth in the instant disclosure.

Communication interface 1222 broadly represents any type or form of communication device or adapter capable of facilitating communication between exemplary computing system 1210 and one or more additional devices. For example, in certain embodiments communication interface 1222 may facilitate communication between computing system 1210 and a private or public network comprising additional computing systems. Examples of communication interface 1222 include, without limitation, a wired network interface (such as a network interface card), a wireless network interface (such as a wireless network interface card), a modem, and any other suitable interface. In at least one embodiment, communication interface 1222 may provide a direct connection to a remote server via a direct link to a network, such as the Internet. Communication interface 1222 may also indirectly provide such a connection through, for example, a local area network (such as an Ethernet network), a personal area network (such as a BLUETOOTH network), a telephone or cable network, a cellular telephone connection, a satellite data connection, or any other suitable connection.

In certain embodiments, communication interface 1222 may also represent a host adapter configured to facilitate communication between computing system 1210 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1222 may also allow computing system 1210 to engage in distributed or remote computing. For example, communication interface 1222 may receive instructions from a remote device or send instructions to a remote device for execution. In certain embodiments, communication interface 1222 may perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps disclosed herein. Communication interface 1222 may also be used to perform and/or be a means for performing other steps and features set forth in the instant disclosure.

As illustrated in FIG. 12, computing system 1210 may also comprise at least one display device 1224 coupled to communication infrastructure 1212 via a display adapter 1226. Display device 1224 generally represents any type or form of device capable of visually displaying information forwarded by display adapter 1226. Similarly, display adapter 1226 generally represents any type or form of device configured to forward graphics, text, and other data from communication infrastructure 1212 (or from a frame buffer, as known in the art) for display on display device 1224.

As illustrated in FIG. 12, exemplary computing system 1210 may also comprise at least one input device 1228 coupled to communication infrastructure 1212 via an input interface 1230. Input device 1228 generally represents any type or form of input device capable of providing input, either computer or human generated, to exemplary computing system 1210. Examples of input device 1228 include, without limitation, a keyboard, a pointing device, a speech recognition device, or any other input device. In at least one embodiment, input device 1228 may perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps disclosed herein. Input device 1228 may also be used to perform and/or be a means for performing other steps and features set forth in the instant disclosure.

As illustrated in FIG. 12, exemplary computing system 1210 may also comprise a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210.

In certain embodiments, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also comprise other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 1210 or may be a separate device accessed through other interface systems.

In certain embodiments, the exemplary file systems disclosed herein may be stored on primary storage device 1232, while the exemplary file-system backups disclosed herein may be stored on backup storage device 1233. Storage devices 1232 and 1233 may also be used, for example, to perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps disclosed herein. Storage devices 1232 and 1233 may also be used to perform and/or be a means for performing other steps and features set forth in the instant disclosure.

Many other devices or subsystems may be connected to computing system 1210. Conversely, all of the components and devices illustrated in FIG. 12 need not be present to practice the embodiments descried and/or illustrated herein. The devices and subsystems referenced above may also be interconnected in different ways from that shown in FIG. 12. Computing system 1210 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1210 may be configured as an application specific integrated circuit (ASIC) adapted to implement one or more of the exemplary embodiments disclosed herein.

Figure 13:
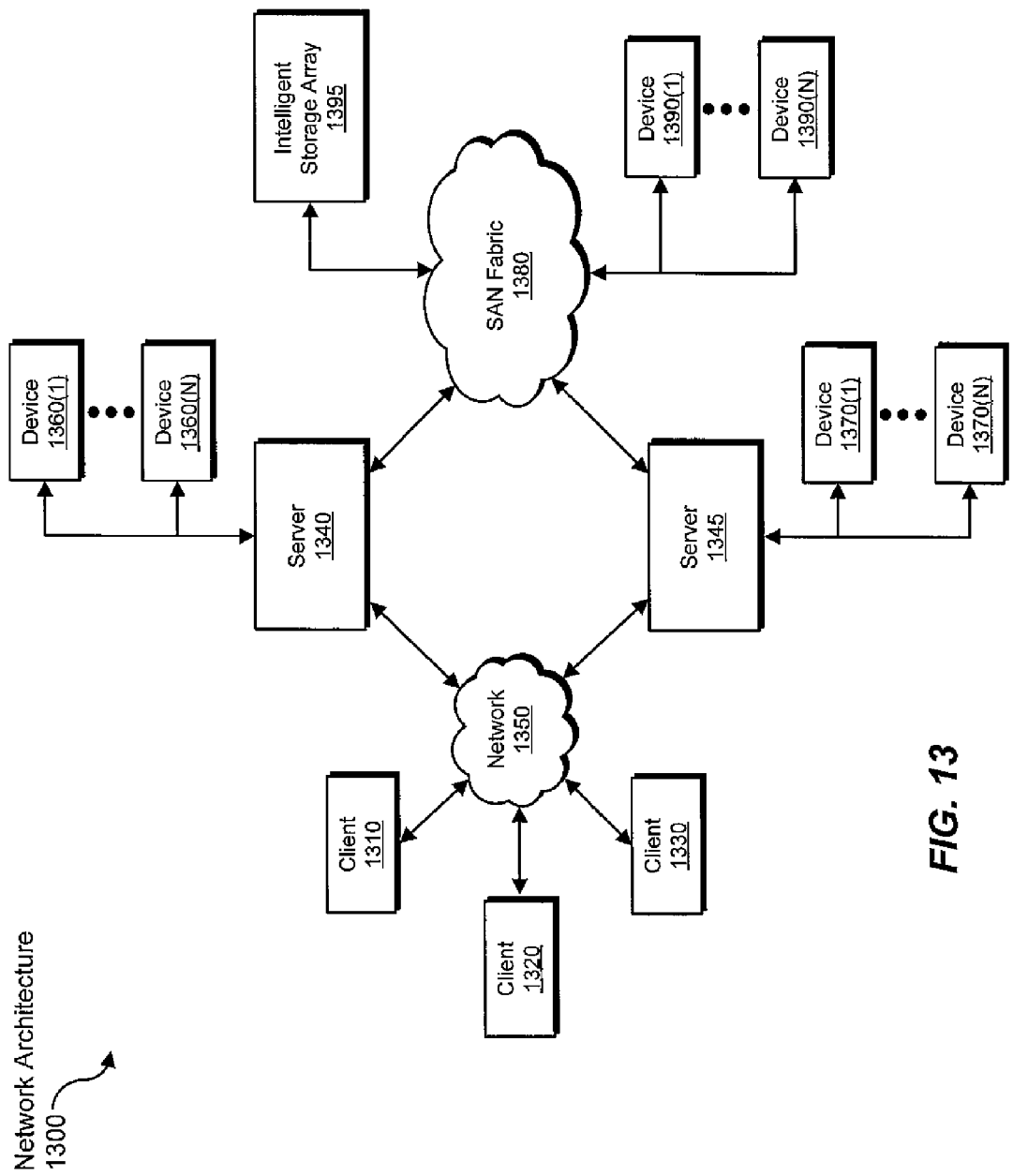
FIG. 13 is a block diagram of an exemplary computing network capable of implementing one or more of the embodiments described and/or illustrated herein.

FIG. 13 is a block diagram of an exemplary network architecture 1300 in which client systems 1310, 1320, and 1330 and servers 1340 and 1345 may be coupled to a network 1350. Client systems 1310, 1320, and 1330 generally represent any type or form of computing device or system, such as exemplary computing system 1210 in FIG. 12. Similarly, servers 1340 and 1345 generally represent computing devices or systems, such as application servers or database servers, configured to provide various database services and/or to run certain software applications. Network 1350 generally represents any telecommunication or computer network; including, for example, an intranet, a wide area network (WAN), a local area network (LAN), a personal area network (PAN), or the Internet.

As illustrated in FIG. 13, one or more storage devices 1360(1)-(N) may be directly attached to server 1340. Similarly, one or more storage devices 1370(1)-(N) may be directly attached to server 1345. Storage devices 1360(1)-(N) and storage devices 1370(1)-(N) generally represent any type or form of storage device or medium capable of storing data and/or other computer-readable instructions. In certain embodiments, storage devices 1360(1)-(N) and storage devices 1370(1)-(N) may represent network-attached storage (NAS) devices configured to communicate with servers 1340 and 1345 using various protocols, such as NFS, SMB, or CIFS.

Servers 1340 and 1345 may also be connected to a storage area network (SAN) fabric 1380. SAN fabric 1380 generally represents any type or form of computer network or architecture capable of facilitating communication between a plurality of storage devices. SAN fabric 1380 may facilitate communication between servers 1340 and 1345 and a plurality of storage devices 1390(1)-(N) and/or an intelligent storage array 1395. SAN fabric 1380 may also facilitate, via network 1350 and servers 1340 and 1345, communication between client systems 1310, 1320, and 1330 and storage devices 1390(1)-(N) and/or intelligent storage array 1395 in such a manner that devices 1390(1)-(N) and array 1395 appear as locally attached devices to client systems 1310, 1320, and 1330. As with storage devices 1360(1)-(N) and storage devices 1370(1)-(N), storage devices 1390(1)-(N) and intelligent storage array 1395 generally represent any type or form of storage device or medium capable of storing data and/or other computer-readable instructions.

In certain embodiments, and with reference to exemplary computing system 1210 of FIG. 12, a communication interface, such as communication interface 1222 in FIG. 12, may be used to provide connectivity between each client system 1310, 1320, and 1330 and network 1350. Client systems 1310, 1320, and 1330 may be able to access information on server 1340 or 1345 using, for example, a web browser or other client software. Such software may allow client systems 1310, 1320, and 1330 to access data hosted by server 1340, server 1345, storage devices 1360(1)-(N), storage devices 1370(1)-(N), storage devices 1390(1)-(N), or intelligent storage array 1395. Although FIG. 13 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1340, server 1345, storage devices 1360(1)-(N), storage devices 1370(1)-(N), storage devices 1390(1)-(N), intelligent storage array 1395, or any combination thereof. All or a portion of one or more of the exemplary embodiments disclosed herein may also be encoded as a computer program, stored in server 1340, run by server 1345, and distributed to client systems 1310, 1320, and 1330 over network 1350. Accordingly, network architecture 1300 may perform and/or be a means for performing, either alone or in combination with other elements, one or more of the creating, transmitting, detecting, receiving, displaying, prompting, determining, allowing, preventing, performing, identifying, obtaining, analyzing, comparing, calculating, and providing steps disclosed herein. Network architecture 1300 may also be used to perform and/or be a means for performing other steps and features set forth in the instant disclosure.

As detailed above, computing system 1210 and/or one or more of the components of network architecture 1300 may perform and/or be a means for performing, either alone or in combination with other elements, one or more steps of the exemplary methods described and/or illustrated herein. For example, a computer-implemented method for determining the potential impact of a new application on the health of a computing system may comprise creating a profile of the computing system, transmitting the profile of the computing system to a server, detecting a new application, transmitting a request for health-impact information for the new application to the server, and receiving the health-impact information for the new application from the server. In at least one embodiment, the health-impact information may identify the potential impact of the new application on the health of the computing system and be based at least in part on at least one characteristic of the profile of the computing system.

The profile of the computing system and the request for the health-impact information for the new application may be simultaneously transmitted to the server. In addition, the profile of the computing system may comprise a unique identifier for the computing system and the request for health-impact information for the new application may comprise a unique identifier for the new application.

In certain embodiments, the method may further comprise displaying the health-impact information for the new application to a user and, after displaying the health-impact information, prompting the user to allow or deny installation of the new application. Alternatively, the method may further comprise determining whether the health-impact information satisfies predetermined criteria, allowing the new application to install on the computing system if the health-impact information satisfies the predetermined criteria, and preventing the new application from installing on the computing system if the health-impact information fails to satisfy the predetermined criteria.

In at least one embodiment, the health-impact information may comprise a health-impact score for the new application that is derived from information obtained from computing systems having profiles that are substantially similar to the profile of the computing system. In addition, the new application may be detected before the new application is fully installed on the computing system.

The method may also further comprise performing a first evaluation of the computing system's health, allowing the new application to fully install on the computing system, performing a second evaluation of the computing system's health after the new application is fully installed on the computing system, and then transmitting the results of the first evaluation and the second evaluation to the server. In certain embodiments, the first evaluation may be performed before the new application is fully installed on the system.

The method may also further comprise detecting a second new application, creating an updated profile of the computing system, performing a third evaluation of the health of the computing system after the second new application is fully installed on the computing system, and then transmitting the results of the third evaluation, along with the updated profile of the computing system, to the server. In certain embodiments, detecting the new application may comprise identifying all data, files, and system changes associated with, or that result from installing, the new application.

In an additional embodiment, a computer-implemented method for determining the health impact of an application based on information obtained from like-profiled computing systems may comprise obtaining a plurality of computing-system profiles, obtaining system-health-evaluation results for each of the plurality of computing-system profiles, identifying, by analyzing the plurality of computing-system profiles, a first set of like-profiled computing systems, identifying, by analyzing the plurality of computing-system profiles, a second set of like-profiled computing systems that are substantially identical to the first set of like-profiled computing systems but for a first application installed on the second set of like-profiled computing systems, and then determining the health impact of the first application by comparing a first set of system-health-evaluation results associated with the first set of like-profiled computing systems with a second set of system-health-evaluation results associated with the second set of like-profiled computing systems.

In certain embodiments, identifying the first set of like-profiled computing systems may comprise identifying, by analyzing the plurality of computing-system profiles, a plurality of substantially identical computing-system profiles. Similarly, identifying the second set of like-profiled computing systems may comprise identifying, by analyzing the plurality of computing-system profiles, a plurality of substantially identical computing-system profiles.

In addition, the method may further comprise: 1) receiving a request for health-impact information for the first application from a client-side computing system (which request may contain a computing-system profile for the client-side computing system that is substantially identical to a computing-system profile for the first set of like-profiled computing systems), 2) determining the potential impact of the first application on the health of the client-side computing system by comparing the first set of system-health-evaluation results with the second set of system-health-evaluation results, and then 3) transmitting a reply to the client-side computing system, the reply comprising information that identifies the potential impact of the first application on the health of the client-side computing system.

In certain embodiments, the first set of system-health-evaluation results may comprise a performance index containing results for at least one performance metric and a stability index containing results for at least one stability metric. In addition, each profile in the plurality of computing-system profiles may comprise a unique identifier associated with a computing system. The first and second sets of like-profiled computing systems may also comprise at least one client-side computing system.

In certain embodiments, determining the health impact of the first application may comprise calculating a health-impact score for the first application. The method may also further comprise providing access to information that identifies the health impact of the first application to a client-side computing system.

As detailed above, one or more of modules 102 in FIG. 1 may represent one or more software applications or programs that, when executed by a computing device, may cause the computing device to perform one or more tasks required to determine the health impact of an application based on information obtained from like-profiled computing systems. For example, a computer-readable medium may comprise one or more computer-executable instructions that, when executed by a computing system, cause the computing system to create a profile of the computing system, transmit the profile of the computing system to a server, detect a new application, transmit a request for health-impact information for the new application to the server, and receive the health-impact information for the new application from the server. In at least one embodiment, the health-impact information may identify the potential impact of the new application on the health of the computing system and be based at least in part on at least one characteristic of the profile of the computing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for determining the health impact of an application based on information obtained from like-profiled computing systems, the method comprising:
    obtaining a plurality of computing-system profiles;
    obtaining system-health-evaluation results for each of the plurality of computing-system profiles;
    identifying, by analyzing the plurality of computing-system profiles using a clustering profile, a first set of like-profiled computing systems;
    identifying, by analyzing the plurality of computing-system profiles, a second set of like-profiled computing systems, the second set of like-profiled computing systems being substantially identical to the first set of like-profiled computing systems but for a first application installed on the second set of like-profiled computing systems;
    determining the health impact of the first application by comparing a first set of system-health-evaluation results associated with the first set of like-profiled computing systems with a second set of system-health-evaluation results associated with the second set of like-profiled computing systems.

2. The method of claim 1, wherein:
    identifying the first set of like-profiled computing systems comprises identifying, by analyzing the plurality of computing-system profiles, a plurality of substantially identical computing-system profiles;
    identifying the second set of like-profiled computing systems comprises identifying, by analyzing the plurality of computing-system profiles, a plurality of substantially identical computing-system profiles.

3. The method of claim 1, further comprising:
    receiving a request for health-impact information for the first application from a client-side computing system, the request comprising a computing-system profile for the client-side computing system that is substantially identical to computing-system profiles of the first set of like-profiled computing systems;
    determining the potential impact of the first application on the health of the client-side computing system by comparing the first set of system-health-evaluation results with the second set of system-health-evaluation results;
    transmitting a reply to the client-side computing system, the reply comprising information that identifies the potential impact of the first application on the health of the client-side computing system.

4. The method of claim 1, wherein the first set of system-health-evaluation results comprises:
    a performance index containing results for at least one performance metric;
    a stability index containing results for at least one stability metric.

5. The method of claim 1, wherein each profile in the plurality of computing-system profiles comprises a unique identifier for a computing system.

6. The method of claim 1, wherein:
    the first set of like-profiled computing systems comprises at least one client-side computing system;
    the second set of like-profiled computing systems comprises at least one client-side computing system.

7. The method of claim 1, wherein determining the health impact of the first application comprises calculating a health-impact score for the first application.

8. The method of claim 1, further comprising providing access to information that identifies the health impact of the first application to a client-side computing system.

* * * * *